US008968222B2

(12) United States Patent
Kazerooni et al.

(10) Patent No.: US 8,968,222 B2
(45) Date of Patent: Mar. 3, 2015

(54) WEARABLE MATERIAL HANDLING SYSTEM

(75) Inventors: Homayoon Kazerooni, Berkeley, CA (US); Nathan Harding, Oakland, CA (US); Russdon Angold, American Canyon, CA (US); Kurt Amundson, Berkeley, CA (US); Jon William Burns, Richmond, CA (US); Adam Zoss, Berkeley, CA (US)

(73) Assignees: Ekso Bionics, Inc., Richmond, CA (US); The Regents of the University of California, Oakland, CA (US)

( * ) Notice: Subject to any disclaimer, the term of this patent is extended or adjusted under 35 U.S.C. 154(b) by 860 days.

(21) Appl. No.: 13/139,933

(22) PCT Filed: Dec. 17, 2009

(86) PCT No.: PCT/US2009/068533
§ 371 (c)(1),
(2), (4) Date: Jun. 15, 2011

(87) PCT Pub. No.: WO2010/101595
PCT Pub. Date: Sep. 10, 2010

(65) Prior Publication Data
US 2011/0266323 A1 Nov. 3, 2011

Related U.S. Application Data

(60) Provisional application No. 61/138,751, filed on Dec. 18, 2008.

(51) Int. Cl.
*A61H 1/00* (2006.01)
*B25J 9/00* (2006.01)

(52) U.S. Cl.
CPC .................................... *B25J 9/0006* (2013.01)
USPC ........ 601/35; 601/5; 601/23; 601/33; 602/16; 602/23; 224/265; 224/637

(58) Field of Classification Search
CPC ........... A61H 1/00; A61H 1/001; A61H 1/02; A61H 1/0237; A61H 1/024; A61H 1/0244; A61H 1/0255; A61H 1/0259; A61H 1/0262; A61H 3/00; A61H 2001/00; A61H 2001/0211; A61H 2001/0237; A61H 2001/0244; A61H 2001/0266; A61H 2003/00; A61H 2201/0157; A61H 2201/12; A61H 2201/1207; A61H 2201/1238; A61H 2201/16; A61H 2201/1614; A61H 2201/1616; A61H 2201/1619; A61H 2201/1621; A61H 2201/1623; A61H 2201/1626; A61H 2201/50; A61H 2201/5007; A61H 2201/5058; A61H 2201/5071; A61H 2203/0406
USPC ............. 601/5, 23, 26, 27, 33, 34, 35, 84, 86, 601/90, 92, 97, 98, 101; 602/5, 16, 19, 23, 602/26; 623/21, 25, 26, 27, 66.1; 128/845, 128/847, 897, 898; 600/587, 595; 224/265, 224/637–640
See application file for complete search history.

(56) References Cited

U.S. PATENT DOCUMENTS

| | | | |
|---|---|---|---|
| 3,449,769 A | 6/1969 | Mizen | |
| 5,020,790 A * | 6/1991 | Beard et al. | 623/27 |
| 6,355,335 B1 | 3/2002 | Kulkaski | |
| 6,666,796 B1 | 12/2003 | MacCready, Jr. | |
| 6,764,231 B1 | 7/2004 | Shubert | |
| 7,544,155 B2 * | 6/2009 | Agrawal et al. | 601/34 |
| 7,628,766 B1 * | 12/2009 | Kazerooni et al. | 601/5 |
| 2005/0059908 A1 * | 3/2005 | Bogert | 601/5 |
| 2005/0279796 A1 * | 12/2005 | Chu et al. | 224/637 |
| 2006/0249315 A1 | 11/2006 | Herr et al. | |
| 2006/0260620 A1 | 11/2006 | Kazerooni et al. | |
| 2006/0276728 A1 | 12/2006 | Ashihara et al. | |
| 2007/0056592 A1 | 3/2007 | Angold et al. | |
| 2007/0090143 A1 | 4/2007 | Clayton, III et al. | |
| 2007/0123997 A1 | 5/2007 | Herr et al. | |

OTHER PUBLICATIONS

Berkeley Bionics HULC exoskeleton system. Datasheet [online]. Berkeley Bionics, Jul. 2008 [retrieved on Jul. 21, 2010]. Retrieved from the Interent: <URL: http://web.archive.org/web/20080731221227/http://berkeleybionics.com/Unrestricted/HULC.html>. Entire Document.

* cited by examiner

*Primary Examiner* — Quang D Thanh
(74) *Attorney, Agent, or Firm* — Diederiks & Whitelaw, PLC

(57) ABSTRACT

An exoskeleton configured to be coupled to a person includes an exoskeleton trunk and leg supports adapted to contact the ground. Hip torque generators extend between the exoskeleton trunk and respective leg supports. A load holding mechanism is rotatably coupled to the exoskeleton trunk, preferably via over-shoulder members configured to support a load in front of the person. In use, hip torque generators create torque between the exoskeleton trunk and respective leg supports in the stance phase, wherein at least one torque generator is configured to create a first torque between the exoskeleton trunk and one of the first and second leg supports in the stance phase opposing a second torque generated on the exoskeleton by a weight of the load. Load bearing sensors may be utilized to determine the torque generated by the load and communicate with a controller to control power to the torque generators.

41 Claims, 14 Drawing Sheets

WEARABLE MATERIAL HANDLING SYSTEM

CROSS-REFERENCE TO RELATED APPLICATIONS

This application represents a National Stage application of PCT/US2009/068533 entitled "Wearable Material Handling System" filed Dec. 17, 2009, pending which claims the benefit of U.S. Provisional Patent Application Ser. No. 61/138,751 entitled "Wearable Material Handling System" filed Dec. 18, 2008.

STATEMENT REGARDING FEDERALLY SPONSORED RESEARCH OR DEVELOPMENT

This invention was made with government support under Contract No. DAD1 9-01-1-0509 awarded by Defense Advanced Research Projects Agency (DARPA) and National Science Foundation award number IIP-0739552. The government has certain rights in this invention.

BACKGROUND OF THE INVENTION

1. Field of the Invention

The present invention relates generally to the field of material handling systems and, more particularly, to the field of lower extremity exoskeletons that are worn by their wearers and allow for carrying heavy loads in front of their wearers.

2. Discussion of the Prior Art

In general, it is known in the art to provide orthotic devices to aid a person in walking or carrying a load. One example, such as set forth in U.S. Patent Application Publication No. 2007/0056592, provides an exoskeleton including a power unit to provide power to torque generators connecting a thigh link of the exoskeleton with a shank link of the exoskeleton. The '592 publication basically addresses providing power to a knee portion of an exoskeleton. In another example set forth in U.S. Patent Application Publication No. 2007/0123997, an exoskeleton worn by a human includes a hip joint having a passive spring or an actuator to assist in lifting an exoskeleton and to propel the exoskeleton forward. The '997 publication notes that a backpack may be carried utilizing the exoskeleton, although no details regarding the backpack structure are provided. Further, the '997 publication notes that positive power from hip actuators is added at a hip during a stance phase to propel the mass of the human and the backpack forward, and to cancel the mass of the human and exoskeleton during a swing phase. Although useful to aid a user in walking or carrying a backpack, the above-references do not provide a means enabling a user to support a front load utilizing an exoskeleton to reduce the energy expended by the user. Therefore, there is seen to exist a need in the art for an exoskeleton device which provides a user with the means to manipulate a frontal payload and reduce the energy required to manipulate and transfer the payload.

SUMMARY OF THE INVENTION

The opportunities described above are addressed in several embodiments of a lower extremity exoskeleton, wearable by a person. The exoskeleton includes an exoskeleton trunk configurable to be coupled to a person's upper body and first and second leg supports configurable to be coupled to a person's lower limbs and rest on a support surface during a stance phase. Each leg support includes a thigh link and a shank link connected by respective knee joints to allow flexion and extension between respective shank and thigh links. A load holding mechanism is preferably rotatably coupled to the exoskeleton trunk and is configured to support a load in front of a person coupled to the exoskeleton. In some embodiments, the load holding mechanism is coupled to over-shoulder members extending from the exoskeleton. In use, hip torque generators coupled to respective first and second leg supports create torque between the exoskeleton trunk and one of the first and second thigh links in the stance phase, wherein at least one torque generator creates a first torque between the exoskeleton trunk and the one of the first and second leg supports in the stance phase opposing a second torque generated on the exoskeleton by a weight of the load. In the preferred embodiment, a power unit is in communication with the hip torque generators for selectively supplying torque to the hip torque generator based on signals sensed by sensors located on the exoskeleton.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

These and other features, aspects, and advantages of the present invention will become better understood when the following detailed description is read with reference to the accompanying drawings in which like characters represent corresponding parts throughout the drawings, wherein.

DETAILED DESCRIPTION OF THE INVENTION

Figure 1:
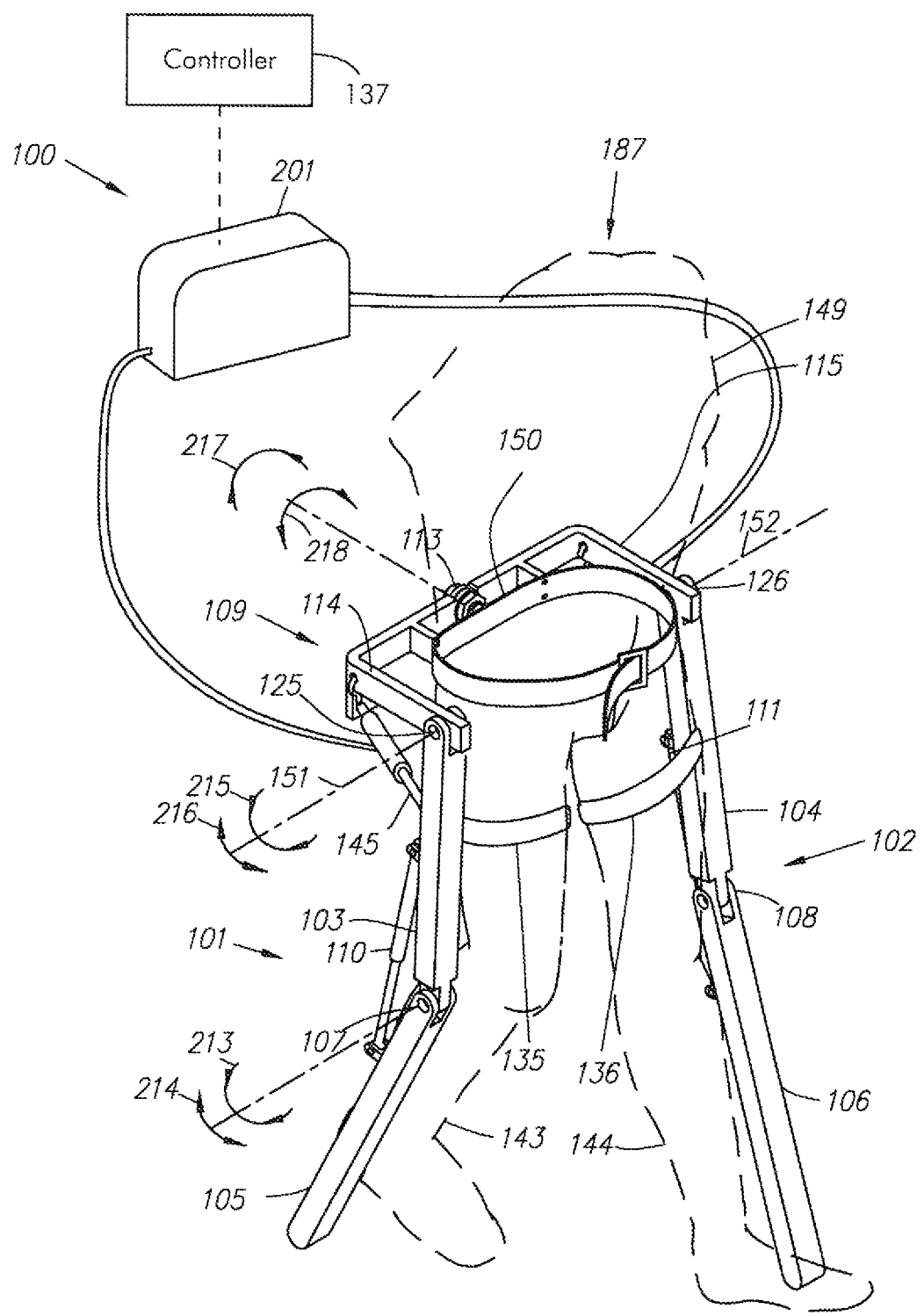
FIG. 1 is a front perspective drawing of a lower extremity exoskeleton.

In accordance with one embodiment of the present invention, FIG. 1 is a perspective drawing illustrating a lower extremity exoskeleton 100 which is wearable by a person indicated at 187. Lower extremity exoskeleton 100, in addition to other components, includes two leg supports 101 and 102, which are configured to be coupled to a person's respective lower limbs 143 and 144 and configured to rest on the ground, or a support surface, during a stance phase. The leg supports 101 and 102, in addition to other components, include respective thigh links 103 and 104, and shank links 105 and 106. Two knee joints 107 and 108 are configured to allow flexion (indicated by arrow 213) and extension (indicated by arrow 214) between the respective shank and thigh links 103 and 105 and 104 and 106 of leg supports 101 and 102 during a corresponding leg support swing phase. In some embodiments, knee joints 107 and 108 are configured to resist flexion between the respective shank and thigh links 103, 105 and 104, 106 of respective leg supports 101 and 102 during a corresponding leg support stance phase. Lower extremity exoskeleton 100 further comprises an exoskeleton trunk 109. Exoskeleton trunk 109, among other components, comprises an upper body interface device 150 adapted to couple exoskeleton trunk 109 to the upper body 149 of a person wearing the exoskeleton. It should be understood that upper body 149 means any location generally above the thighs including the buttocks. Examples of upper body interface device 150 include, without limitation, an element or combination of elements such as vests, belts, straps, shoulder straps, chest straps, body cast, harness, waist belts, and combinations thereof.

Figure 2:
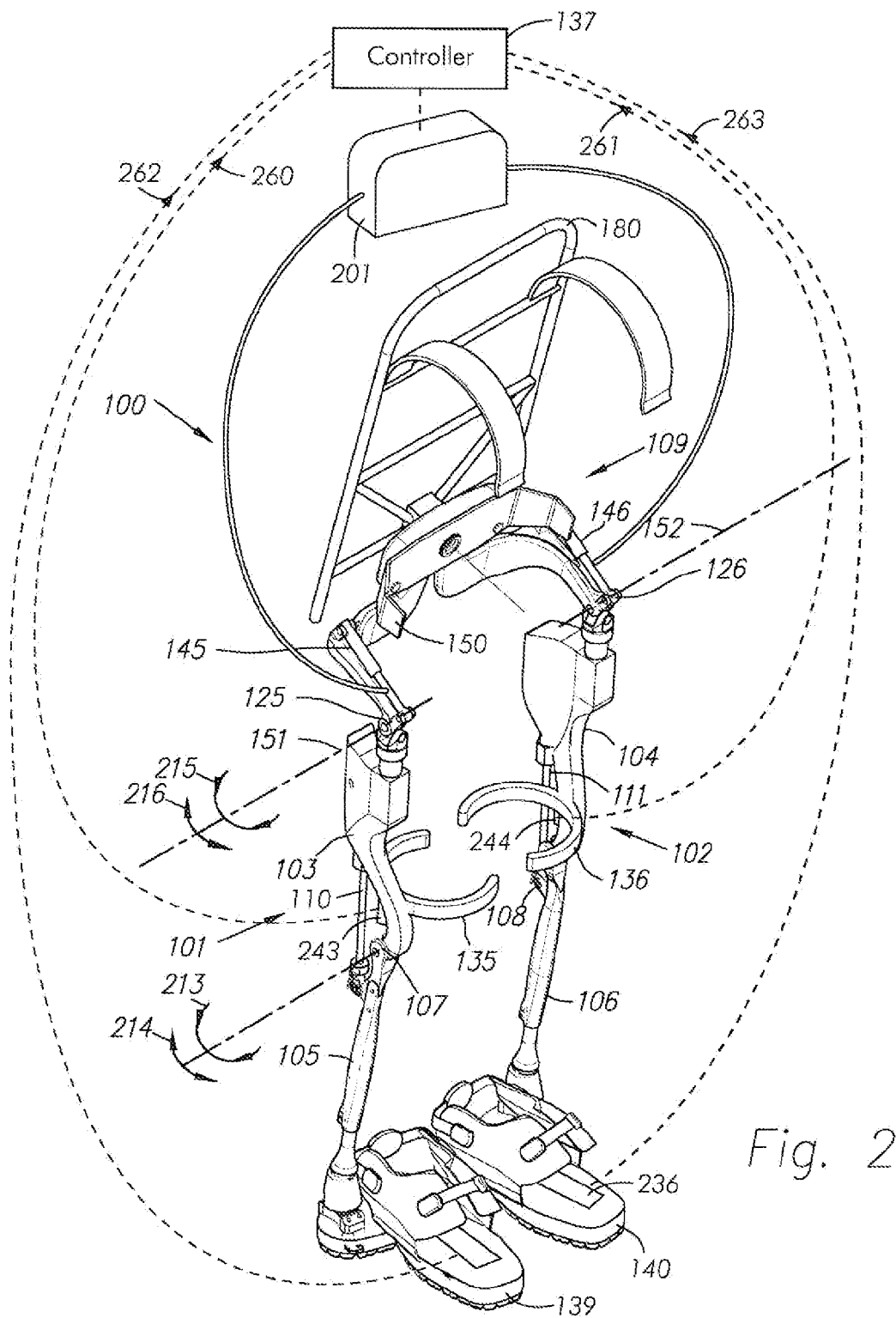
FIG. 2 is a front perspective drawing of a lower extremity exoskeleton wherein an exoskeleton trunk includes a frame member.

Exoskeleton trunk 109 is rotatably connectable to leg supports 101 and 102 at respective hip flexion-extension joints 125 and 126, allowing for the hip flexion and extension rotations (shown by hip extension arrow 215 and hip flexion arrow 216 respectively) of leg supports 101 and 102 about hip flexion-extension axes 151 and 152 respectively. In some embodiments, as shown in FIG. 1, exoskeleton trunk 109 includes two hip links 114 and 115 rotatably connectable to thigh links 103 and 104 at hip flexion-extension joints 125 and 126, allowing for the flexion and extension of leg supports 101 and 102 about hip flexion-extension axes 151 and 152 respectively. Hip links 114 and 115 may be rotatably connected to each other at abduction-adduction joint 113 allowing for abduction and/or adduction of leg supports 101 and 102. Abduction and adduction of leg supports 101 and 102 are shown by arrows 217 and 218 respectively. Leg supports 101 and 102 are configurable to be coupled to a person's lower limbs 143 and 144 through lower limb interface straps 135 and 136. In some embodiments, as shown in FIG. 1, lower limb interface straps 135 and 136 are coupled to respective thigh links 103 and 104. In other embodiments, lower limb interface straps 135 and 136 are coupled to respective shank links 105 and 106. Alternatively, lower limb interface straps may be coupled to both shank links 105, 106 and thigh links 103, 104. Each lower limb interface strap 135 and 136 comprises an element or combination of elements including, without limitation, straps, bars, c-shaped brackets, body cast, and elastomers. In operation, person 187 is coupled to (or wears) lower extremity exoskeleton 100 through upper body interface device 150 (a simple belt in this case of FIG. 1) and by coupling to leg supports 101 and 102 through lower limb interface straps 135 and 136. As best seen in FIG. 2, lower extremity exoskeleton 100 further comprises two hip torque generators 145 and 146 which are configured to create torques between exoskeleton trunk 109 and respective leg supports 101 and 102. In addition, two torque generators 110 and 111 may be coupled across respective knee joints 107 and 108.

In some embodiments, hip torque generators 145 and 146 are powered actuators. Preferably, lower extremity exoskeleton 100 further comprises at least one power unit 201 capable of providing power to hip actuators 145 and 146. In some embodiments, only one power unit 201 provides power to hip actuators 145 and 146, while in other embodiments, each hip actuator 145 and 146 receives power from a separate power unit (now shown). Hip actuators 145 and 146 comprise any device or combination of devices capable of providing torque. Examples of hip actuators 145 and 146 include electric motors, including, without limitation, AC (alternating current) motors, brush-type DC (direct current) motors, brushless DC motors, DC motors with transmission, electronically commutated motors (ECMs), stepping motors, hydraulic actuators, and pneumatic actuators and combinations thereof. In some embodiments of the invention, torque generators 145 and 146 comprise springs. In other embodiments, hip actuators 145 and 146 are powered by compressed gas. Further details of hip actuators intended for use with the present invention can be found in U.S. patent application Ser. No. 12/468,487 entitled "Device and Method for Decreasing Oxygen Consumption of a Person During Steady Walking by Use of a Load Carrying Exoskeleton", which is hereby incorporated by reference.

Preferably, exoskeleton 100 also includes a controller or signal processor 137 in communication with power unit 201 for regulating power unit 201. Signal processor 137 comprises an element or combination of elements selected from a group consisting of analog devices; analog computation modules; digital devices including, without limitation, small-, medium-, and large-scale integrated circuits, application specific integrated circuits, programmable gate arrays, and programmable logic arrays; and digital computation modules including, without limitation, microcomputers, microprocessors, microcontrollers, and programmable logic controllers. In some embodiments signal processor 137 comprises an element or combination of elements selected from a group consisting of electromechanical relays or MOSFET switches. Under the control of signal processor 137, power unit 201 generates command signals for (among other things) the torques imposed by hip torque generators 145 and 146. It should be understood that signal processor 137 may be incorporated into power unit 201, or may be separately located from power unit 201.

Figure 3:
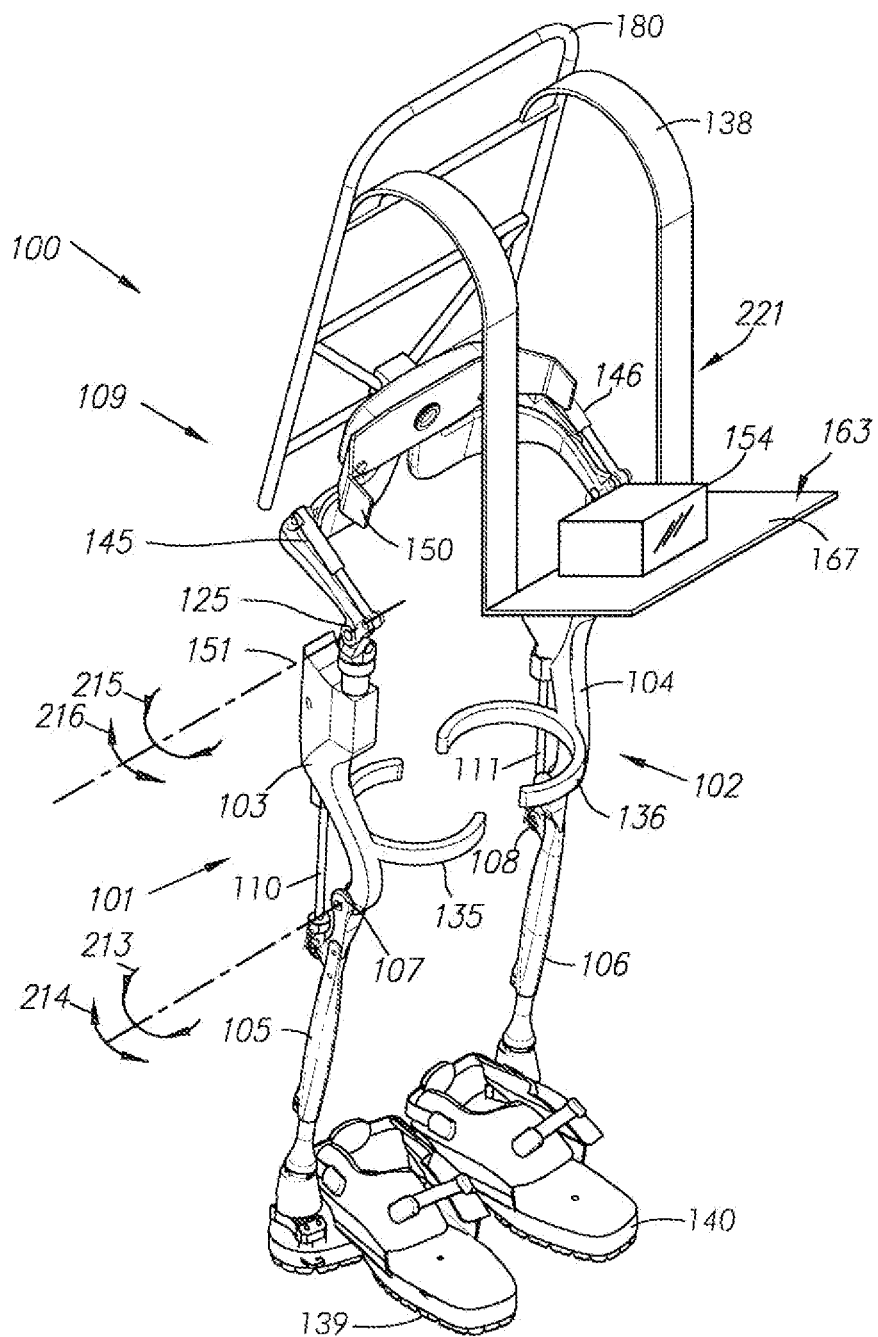
FIG. 3 is a front perspective drawing of an embodiment of the present invention wherein a load holding mechanism is coupled to the exoskeleton trunk.

FIG. 2 shows an embodiment of the invention wherein exoskeleton trunk 109 is in the form of a frame member 180 which extends upward along the back of person 187 up to at least the shoulder region of person 187. As shown in FIG. 3, a load holding mechanism 221 is coupled to exoskeleton trunk 109 and is configurable to support at least a portion of the weight of a front load 154 located in front of person 187. In operation, when lower extremity exoskeleton 100 is worn by person 187, torque generator 145 is configured to create a torque between exoskeleton trunk 109 and leg support 101 in the stance phase. This torque opposes the torque generated by the weight of front load 154. Similarly torque generator 146 is configured to create a torque between exoskeleton trunk 109 and leg support 102 in the stance phase. This torque opposes the torque generated by the weight of front load 154. In addition, although not shown, exoskeleton trunk 109 may be configured to hold a rear load behind person 187.

Figure 4:
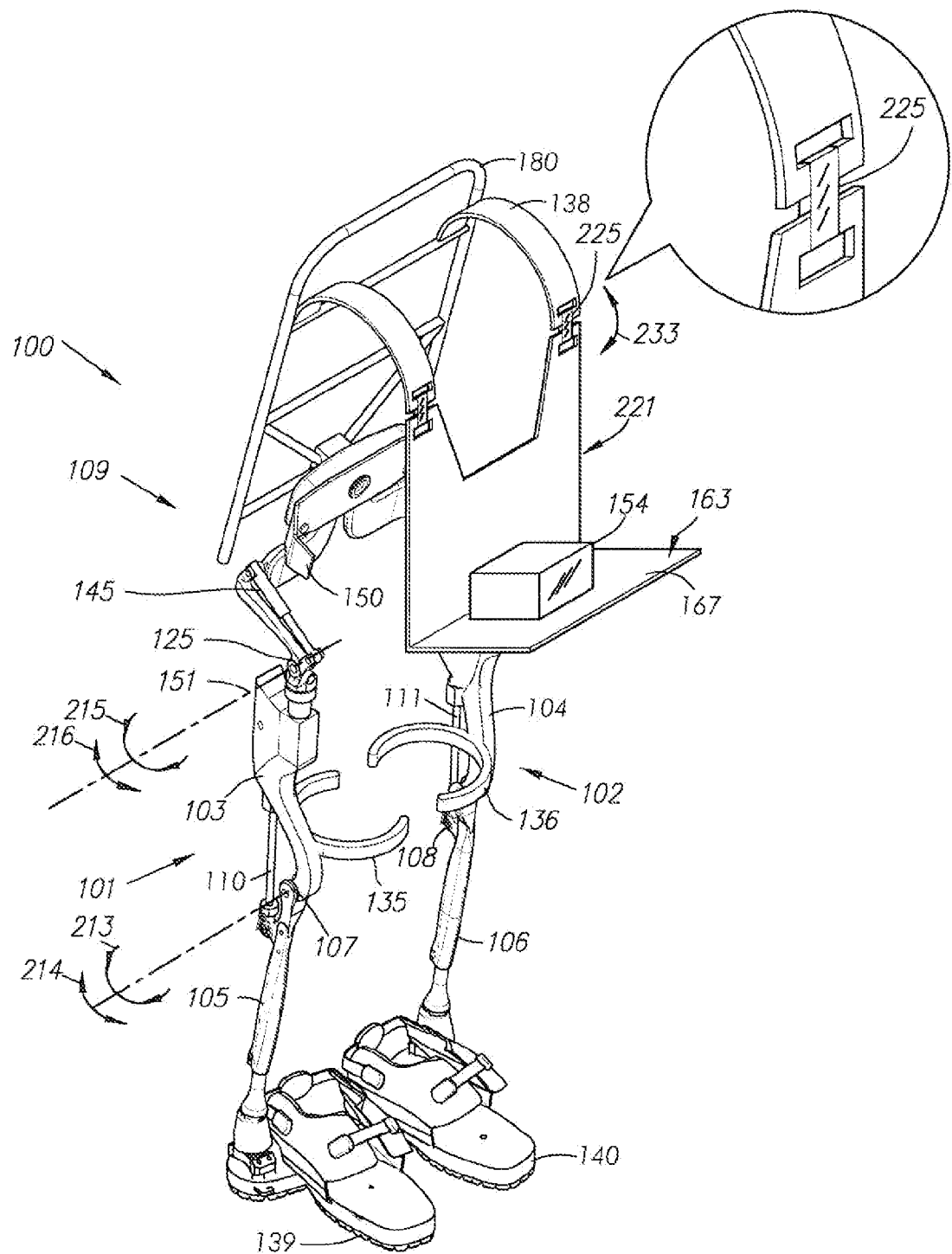
FIG. 4 is a front perspective drawing of an embodiment of the present invention including a load holding mechanism coupled to an over-shoulder member through a flexible hinge.
Figure 5:
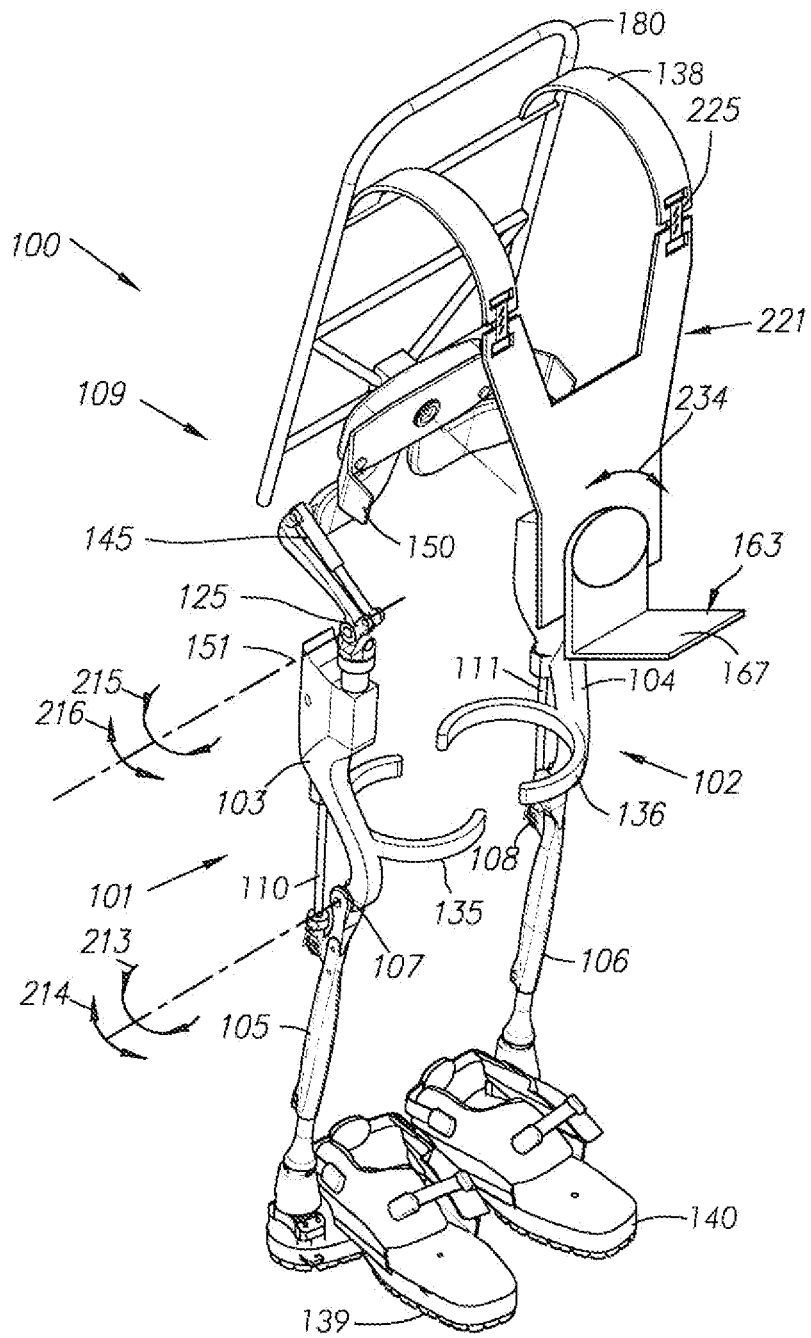
FIG. 5 is a front perspective drawing of an embodiment of the present invention including a load bearing platform member moveably attached to a load holding mechanism.
Figure 6:
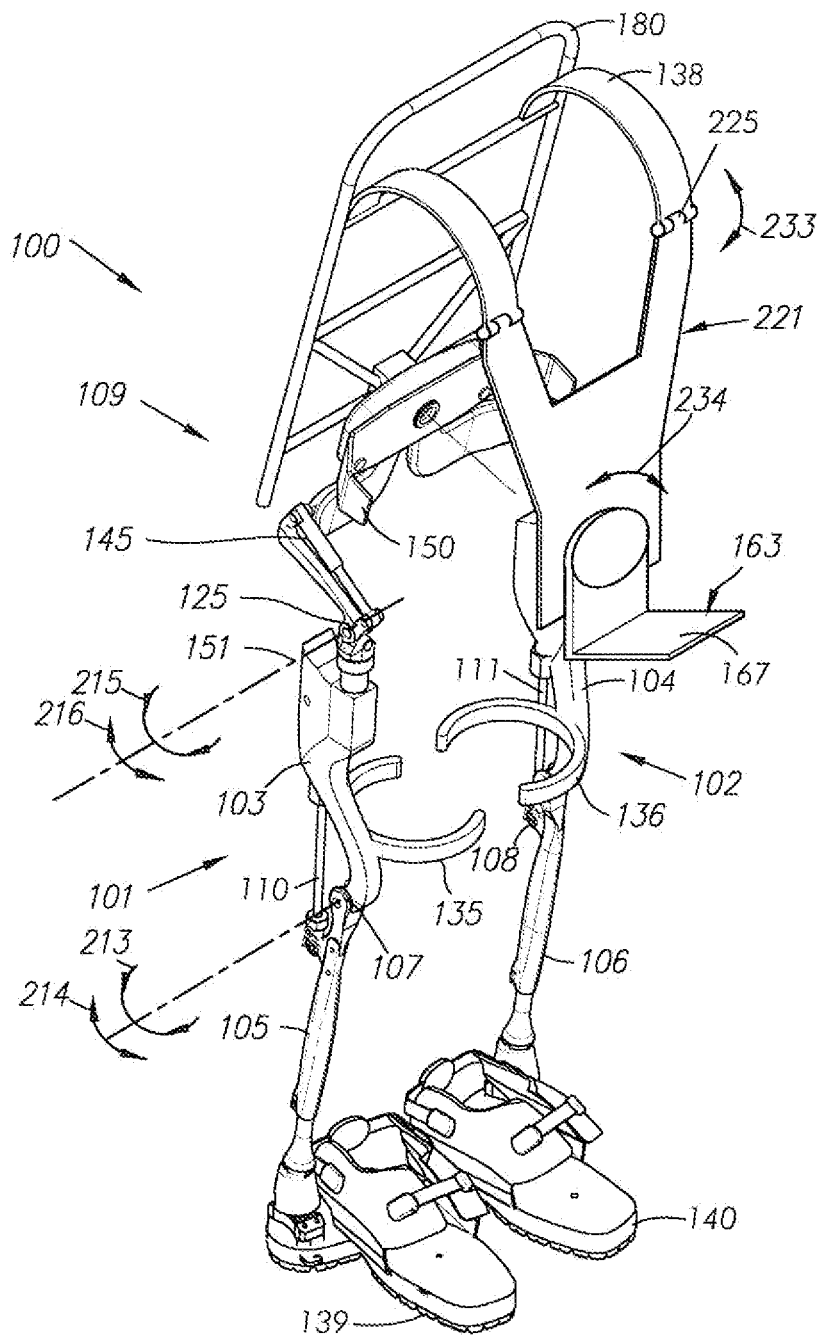
FIG. 6 is a front perspective drawing of an embodiment of the present invention including a load holding mechanism coupled to an exoskeleton trunk through a hinge.
Figure 9:
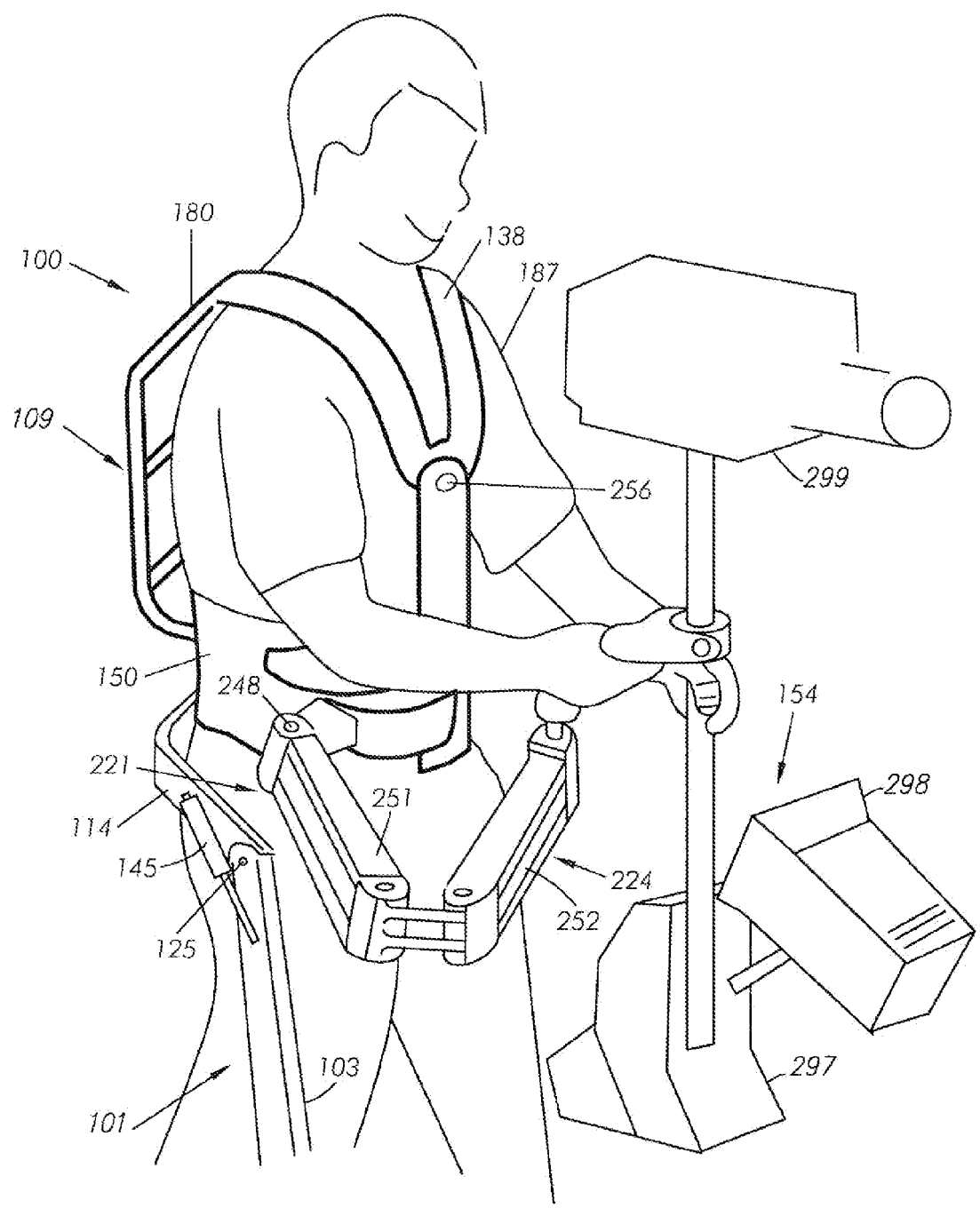
FIG. 9 is a front perspective drawing of an embodiment of the present invention including a front-mounted, multi-degree of freedom load holding mechanism.
Figure 10:
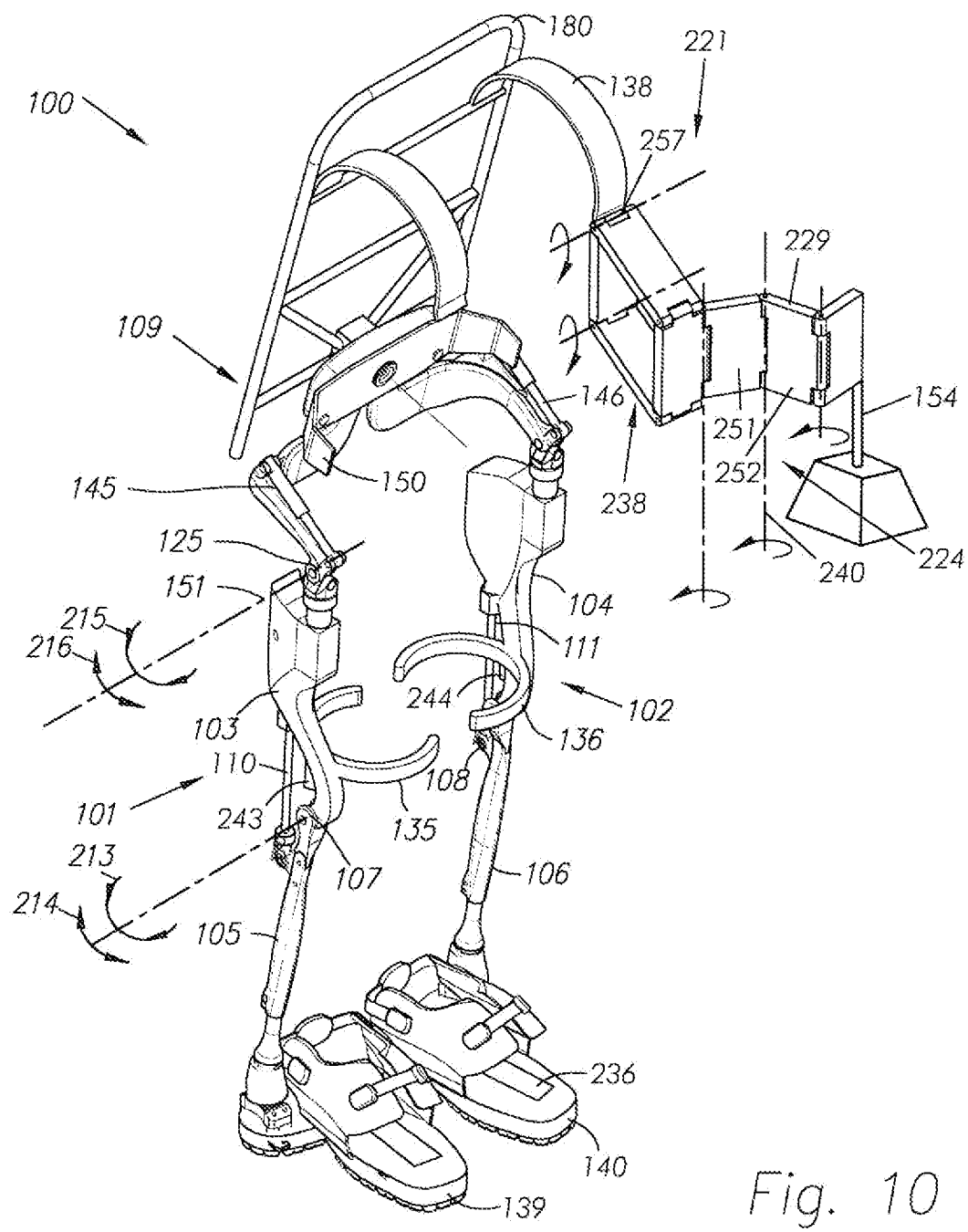
FIG. 10 is a front perspective drawing of an embodiment of the present invention including a multi-degree of freedom load holding mechanism connected to a over-shoulder member.
Figure 12:
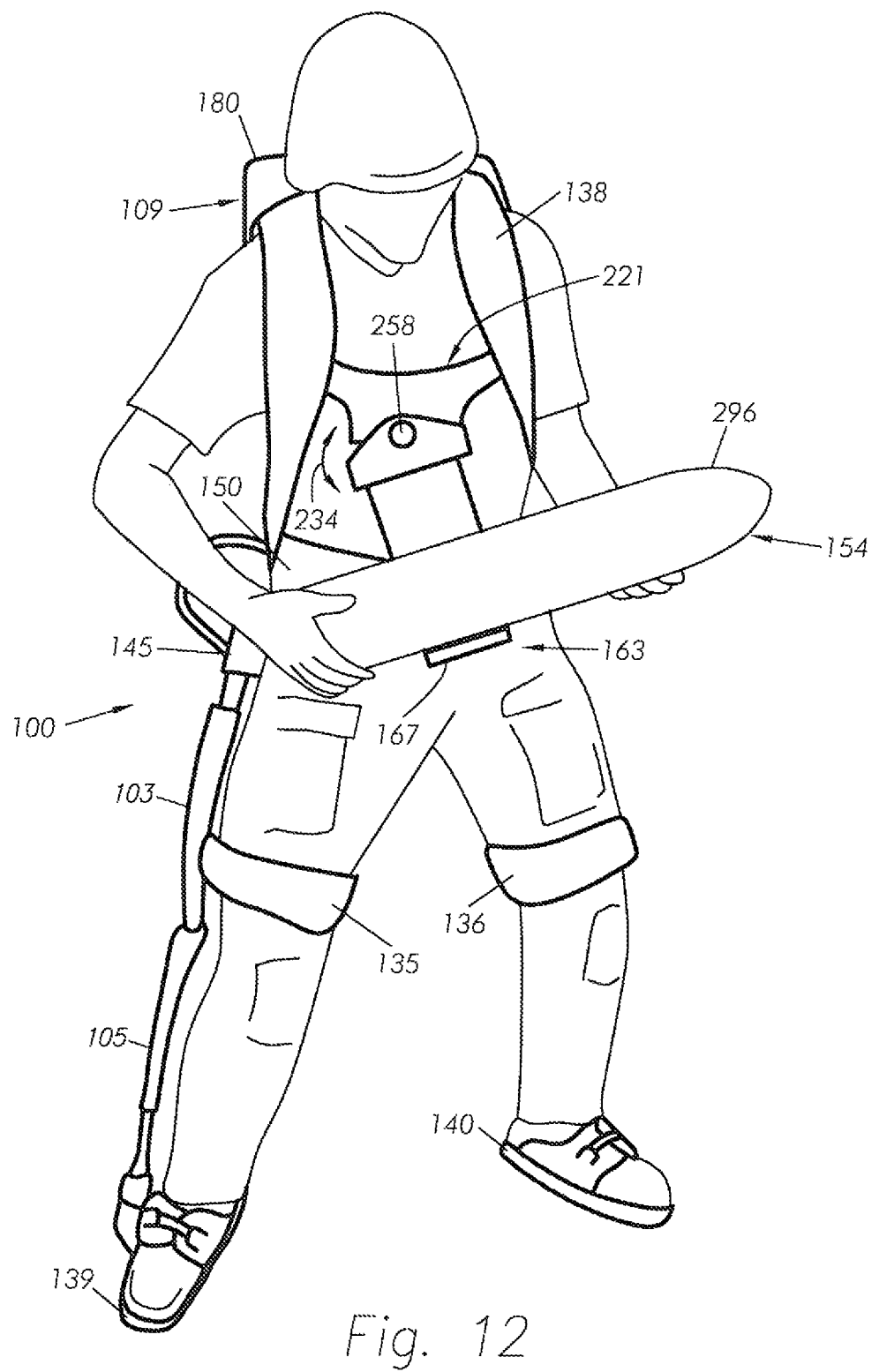
FIG. 12 depicts a user supporting a projectile with a load holding mechanism of the present invention.

In one preferred embodiment shown in FIG. 3, load holding mechanism 221 is coupled to exoskeleton trunk 109 over the shoulder of person 187 via one or more load-bearing over-shoulder members 138. With this configuration, weight from load 154 is borne by exoskeleton 100 rather than person 187. In the embodiment shown in FIG. 4, load holding mechanism 221 is coupled to each over-shoulder member 138 through a flexible hinge 225. Flexible hinge 225 comprises an element or combination of elements selected from a group including leather, fabric, elastomer, rubber, cloth, plastic and combinations thereof. This flexibility allows holding mechanism 221 to swing relative to exoskeleton trunk 109 in the direction shown by arrow 233. In some embodiments, as shown in FIGS. 3 and 4, load holding mechanism 221 further includes a load holding member or load bearing platform member 163 located in front of person 187, which supports at least a portion of the weight of load 154 in front of person 187. In some embodiments of the invention, load bearing platform member 163 includes a plate member 167 extending substantially horizontally. In the embodiments depicted in FIGS. 5, 6, 12 and 13, load bearing platform member 163 is hingedly connected to load holding mechanism 221 such that load bearing platform member 163 can move relative to load holding mechanism 221. Arrow 234 indicates the relative rotation of load bearing platform member 163 to load holding mechanism 221. As best shown in FIG. 12, this rotation allows a person to selectively orient front load 154 in a desired direction. Similar to the embodiment in FIG. 5, FIG. 6 depicts a load holding mechanism 221 coupled to exoskeleton trunk 109 through at least one hinge 225, which allows load holding mechanism 221 to swing vertically relative to exoskeleton trunk 109 in the direction shown by arrow 233. Hinge 225 may be spring loaded to aid in the vertical shifting of load holding mechanism 221. Additionally, to prevent load holding mechanism from pushing on a user's upper body 149, hinge 225 may be configured to limit the swinging motion of load holding mechanism 221 toward the user's upper body 149. Alternatively, load holding mechanism 221 may include a hinge that allows for movement of holding mechanism 221 substantially parallel to the coronal plane of a user, such as hinges 256 and 258 depicted in FIGS. 9 and 12. In yet another embodiment, load holding mechanism 221 includes a hinge 257 that allow for vertical movement of load holding mechanism 221 with respect to over-shoulder member 138, as depicted in FIG. 10.

Figure 7:
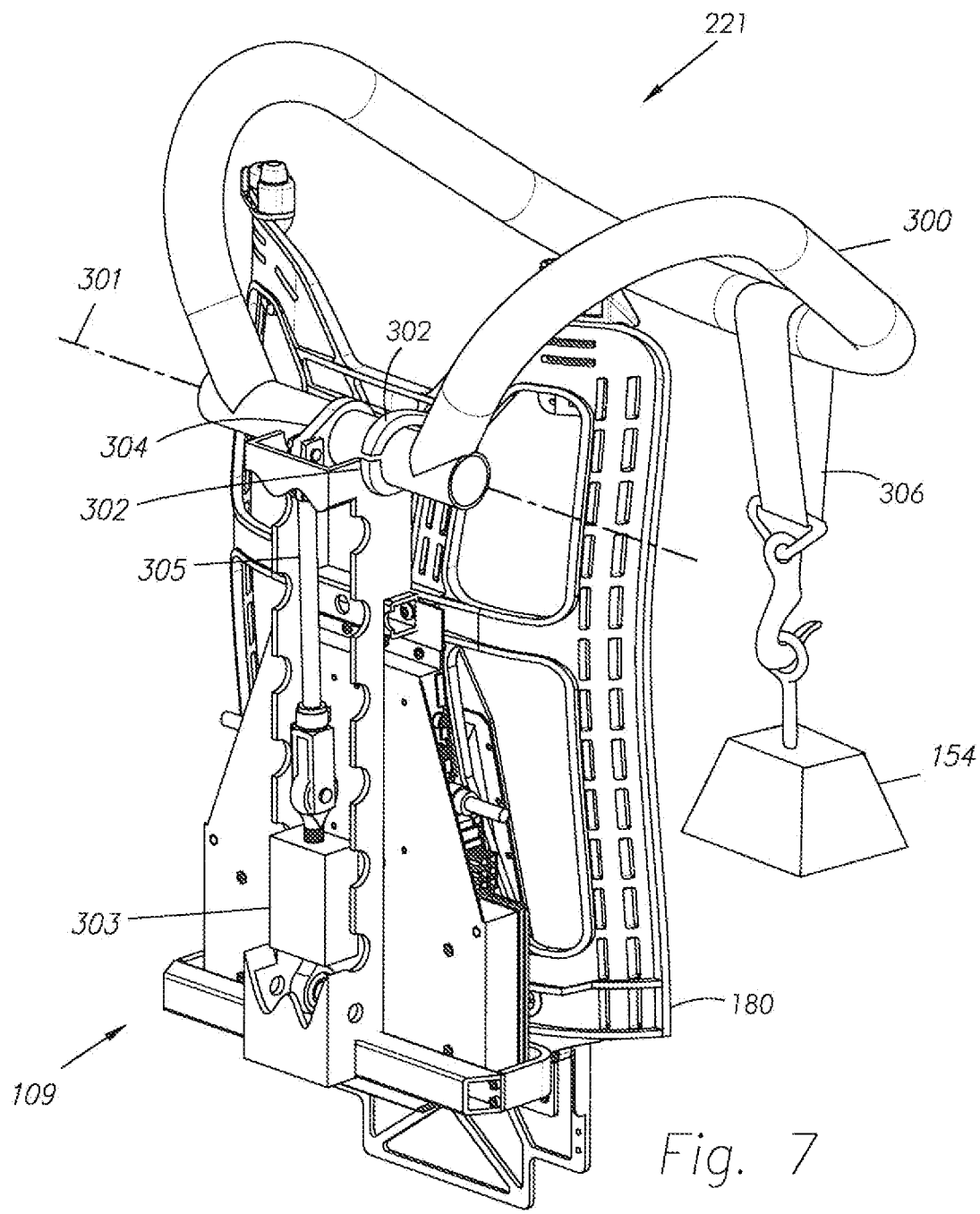
FIG. 7 is a front perspective drawing of an embodiment of the present invention including a U-shaped over-shoulder member connected to a load bearing sensor.

In one embodiment of the invention, as shown in FIG. 7, load holding mechanism 221 includes an over-shoulder member in the form of a U-shaped component 300 capable of being connected to various loads through the use of a load coupling device 306, such as hooks, straps, etc. U-shaped component 300 is capable of rotation relative to exoskeleton trunk 109 about an axis 301 (about a coronal plane of the user in the sagittal direction) via a hinge 302, while one side of hinge 302 is shown in the figure for clarity. U-shaped component 300 is hinged here for two main reasons: (1) to allow the operator to swing U-shaped component 300 up and out of the way when entering or exiting exoskeleton 100, and (2) to allow for accurate measurement of the moment or torque which is being applied to U-shaped component 300 by load 154. The moment is measured by a load sensor 303 which is loaded through a rod or cable 305 which connects to a crank arm 304 about which U-shaped component 300 rotates. The length of the cable 305 is set such that, when a user rotates U-shaped component 300 downward from a loading position above a user to a working position in front of the user, U-shaped component 300 stops in front of the user at a convenient location because the cable 305 has become tight. Once this is done, any load 154 hung on U-shaped component 300 in front of the operator will result in a load in the load cell of sensor 303 generally proportional to the load being carried by U-shaped component 300. A load signal is generated by load sensor 303 and sent to controller 137 in power unit 201 (shown in FIG. 2). This method is important for smooth control of the lower extremity exoskeleton 100. More specifically, power unit 201 is configured such that it will add a torque to hip torque generators 145 and 146 of lower extremity exoskeleton 100 which is proportional to the load sensed by load sensor 303 and will generally cancel the torque put onto exoskeleton trunk 109 by U-shaped component 300. This allows lower extremity exoskeleton 100 to smoothly accept load 154 as it is applied to the U-shaped component 300. Alternatively, a load signal may be generated manually by a user such as by a hand controller (not shown) linked to controller 137.

Figure 14:
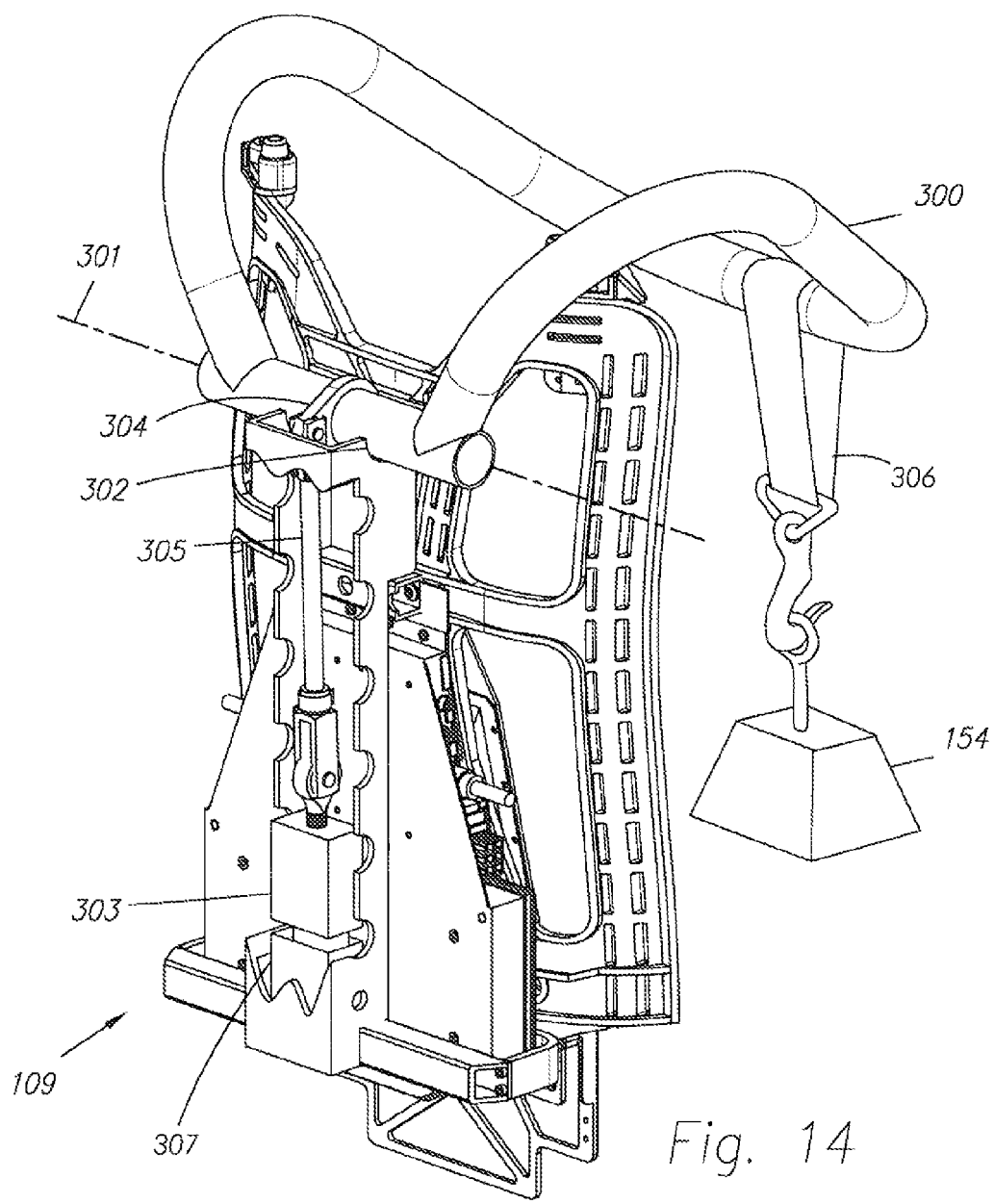
FIG. 14 is a front perspective drawing of an embodiment of the present invention including a U-shaped over-shoulder member connected to a load bearing sensor and including a suspension mechanism.

In a similar embodiment depicted in FIG. 14, exoskeleton 100 further includes a suspension mechanism 307 coupled to U-shaped component 300 and capable of attenuating oscillations from exoskeleton trunk 109 and person 187 to load 154. Suspension mechanism 307 may comprise a spring or a damper. Advantageously, the embodiments depicted in FIGS. 7 and 14 allow an operator of exoskeleton 100 to get in and out of the machine easily and to measure the moment put on the exoskeleton trunk by load 154. Thus, the embodiments in FIGS. 7 and 14 are examples of a convenient design which demonstrates two novel concepts: 1) allowing easy entry and exit from exoskeleton 100, and 2) measuring the moment caused by loads in front of exoskeleton 100 in real time. Additionally, the embodiments of FIGS. 7 and 14 can be used to carry personal armor or shields (not shown). Shields may vary in size and weight, ranging from large shields that protect the user's entire body to smaller shields which only protect a portion of a user's body. Coupling a shield to load holding mechanism 221 provides protection for a user against projectiles or other hazards while supporting a substantial portion of the shield's weight on the exoskeleton.

One skilled in the art will note that, as the operator bends over in the lower extremity exoskeleton 100, the proportionality between the load in load sensor 303 and the torque being created about hip axes 151 and 152 will change. Therefore, in one preferred embodiment of the present invention, a device, such as in the form of sensors, is added to exoskeleton 100 for measuring the absolute angle between exoskeleton trunk 109 and the gravity vector, thereby making it is possible to calculate the moment created by load 154 about hip axes 151 and 152 more exactly. Power unit 201 is configured to apply a more accurate torque to hip joints 125 and 126 in order to cancel the effects of carrying load 154. One type of sensor which can measure the absolute angle between exoskeleton trunk 109 and the gravity vector is generally called an inclinometer. There are many types and methods of constructing such inclinometers, which are well documented and need not be discussed in more detail. For purposes of illustration, angle sensors or inclinometers 243 and 244 are illustrated in FIG. 2 as located in thigh links 103 and 104, however, it should be understood that the actual position of the sensors is not intended to be limited to this embodiment. In use, sensors 243 and 244 send angle signals 260, 261 to controller 137, which estimates the forward velocity of exoskeleton 100.

At this point, the manner in which power unit 201 modifies the torques applied by torque generators 145 and 146 to provide for smooth operation of exoskeleton 100 during maneuvers with a front load 154 will be discussed in more detail. First, it is important to understand that controller 137 and power unit 201 may simultaneously be determining a component of the torque required at one of the hips for some other reason, such as to move the hip with a desired acceleration. In this case, one solution is to simply add the components of the torque together, (one component which is calculated to cancel the effect of front load 154, and another component which is being calculated to produce a desired motion). Here, we are discussing only the component of the hip torques (the torques imposed by torque generators 145 and 146 onto the exoskeleton about hip axes 151 and 152) which is calculated to cancel the moment imposed on exoskeleton trunk 109 by front load 154. When a person is standing with both feet 139 and 140 on the ground, it makes sense to share the torque between each hip joint 125 and 126 equally. However, when one of the exoskeleton legs 101 or 102 is not in contact with the ground, the entire moment caused by load 154 must be canceled by a larger torque imposed onto the exoskeleton hip of the leg support 101 or 102 that is still in contact with the ground. For example, if right exoskeleton leg support 101 is currently in a swing phase and not touching the ground, then the total hip torque required to cancel the moment imposed on exoskeleton trunk 109 by front load 154 will be imposed only onto left exoskeleton hip joint 126 by left hip torque generator 146.

The more challenging question is how to transition between these cases (both feet 139 and 140 equally loaded on the ground versus only one foot on the ground). In the embodiment depicted in FIG. 2, this is accomplished as follows: a load sensor 236 is integrated into each exoskeleton foot 139 and 140 to measure the amount of weight that the operator is putting onto each of their feet 139 and 140. To be clear, sensor 236 measures the force between the operator's foot and the exoskeleton foot 139 and 140 and sends a load signal 262, 263 to controller 137. The relative measurements of these loads are used by controller 137 to determine the operator's intended load distribution. Therefore, the hip torque required to cancel the moment imposed on the exoskeleton trunk 109 by front load 154 can be split between leg supports 101 and 102 in the same proportion that the operator has chosen to split his/her weight between the corresponding feet 139 and 140. For example, if load sensors 236 in exoskeleton feet 139 and 140 are measured, and controller 137 determines that the operator is putting 70% of his weight on right exoskeleton foot 139 and 30% of his weight on left exoskeleton foot 140, then power unit 201 adds a torque component to the commanded torque of right hip torque generator 145 equal to 70% of the required torque to cancel the moment caused by load 154, and adds a torque component to the commanded torque of left hip torque generator 146 equal to 30% of the required torque.

When an operator of exoskeleton 100 starts to walk at a high rate of speed, such a strategy may be complicated by the dynamic changes in the loads under the operator's feet 139 and 140 during double stance (i.e., both feet 139 and 140 in contact with the ground). For example, during heel strike, the heal striking foot of the operator experiences a high load due to the impact, while the toeing off foot is also experiencing a very high load due to the operator pushing off with the toe. This can make the strategy described in the previous paragraph produce very unstable results during double stance. One preferred embodiment of the invention solves this in the following manner: power unit 201 has the ability to determine when steady walking has started and is continuing. This can be accomplished in a number of ways. One example is that controller 137 of power unit 201 uses readings from angle sensors 243, 244 (FIG. 2) adjacent the exoskeleton knee joints 107, 108 to estimate the forward velocity of exoskeleton 100. When this velocity appears to be significant and steady, power unit 201 determines that steady walking has started. While steady walking is continuing, power unit 201 calculates the total hip torque required to cancel the moment imposed on exoskeleton trunk 109 by front load 154, and adds it to the commanded torque for the hip torque generator 145 or 146 associated with the exoskeleton leg support 101 or 102 which is currently in stance. When heal strike occurs (at the start of double-stance), the entirety of the total hip torque required to cancel the moment imposed on the exoskeleton trunk 109 by front load 154 is rapidly removed from the toeing off hip actuator 145 or 146 and ramped up on the heel striking hip actuator 145 or 146 simultaneously in order to keep the total torque imposed constant (in order to cancel the effect of load 154) while the switch occurs. For example, assume that right exoskeleton leg 101 is currently in a swing phase and not touching the ground, therefore the total hip torque required to cancel the moment imposed on the exoskeleton trunk 109 by the front load 154 is being imposed only onto left exoskeleton hip 126 by left hip torque generator 146. When right exoskeleton foot 139 touches the ground, controller 137 and power unit 201 will transition the torque rapidly from left hip torque generator 146 to right hip torque generator 145 in a way that maintains the total torque imposed by both hip torque generators 145 and 146 constant (in order to cancel the effect of load 154) while the switch occurs.

Exoskeleton 100 described herein can be used in a material handling setting to move loads from a first point to a second point. The methods of use described herein allow a person to transfer at least a portion of a load's weight (and other forces such as inertia forces) onto exoskeleton trunk 109 directly using load holding mechanism 221. The weight of load 154 transfers through exoskeleton trunk 109 to first and second leg supports 101 and 102 and then to the ground or support surface. In use, load 154 may be coupled to load holding mechanism 221 by a user of exoskeleton 100, or by other means, such as another person or by crane equipment. Likewise, a variety of different methods may be utilized to unload load 154 from exoskeleton load holding mechanism 221, such as by simply sliding load 154 off of horizontal plate member 167 of load holding mechanism 221, or by use of crane equipment. There are many applications where exoskeleton 100 can be utilized for load handling. In auto assembly plants, for example, tasks with a high risk of injury tend to be those that require a worker to endure prolonged activity in a bent posture. Exoskeleton 100 alleviates stress on a user's back caused by such activities. Exoskeleton 100 has application in distribution centers and warehouse facilities. Additionally, major delivery industries such as the United States Postal Service (USPS) have a great number of distribution centers and warehouses around the world where workers move various boxes and other objects. The following are just some of the many applications envisioned for exoskeleton 100 of the present invention: (1) moving boxes between a pallet and a conveyor belt; (2) moving boxes between a pallet and a truck; and (3) moving boxes between a conveyor belt and a truck.

Figure 11:
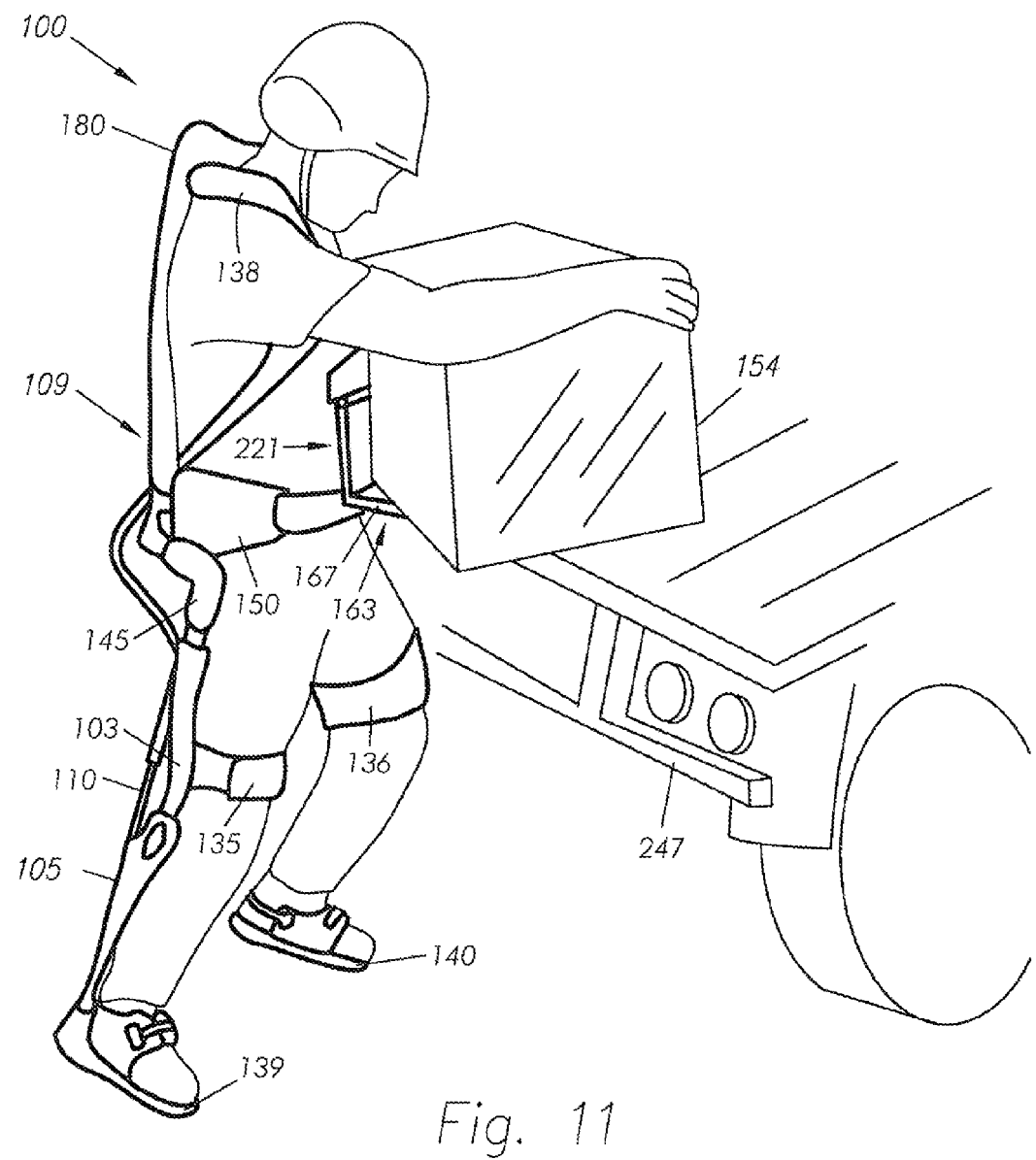
FIG. 11 depicts a user loading a box into a truck utilizing a load holding mechanism constructed in accordance with the present invention.
Figure 13:
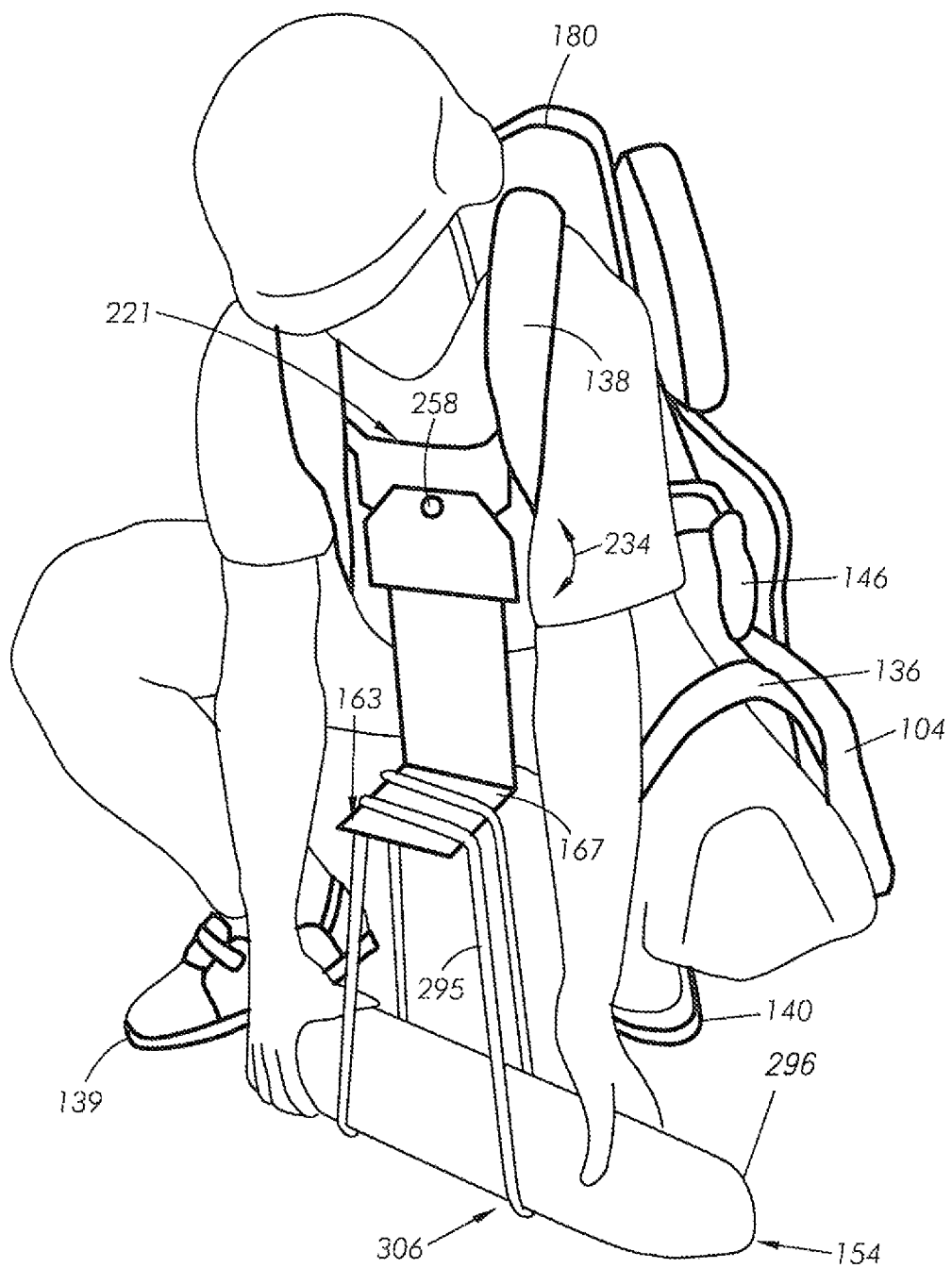
FIG. 13 depicts a user utilizing an exoskeleton and load holding mechanism of the present invention to assist in lifting a projectile.

FIG. 11 shows an embodiment of the invention wherein lower extremity exoskeleton 100 is used in conjunction with load holding mechanism 221 for loading a truck 247. FIGS. 12 and 13 show embodiments of the invention where load bearing platform member 163 is used to lift a payload-carrying projectile (shell) 296. In the embodiment of FIG. 12, when in a loaded position, at least a portion of the weight of payload-carrying projectile 296 is supported by load holding member 163. Alternatively, as depicted in FIG. 13, a load coupling device 306 in the form of rope 295 may be used to couple payload-carrying projectile 296 to load holding mechanism 221. Optionally, load holding mechanism 221 may be coupled to exoskeleton trunk 109 via a suspension mechanism (not shown) capable of attenuating oscillations from exoskeleton trunk 109 and person 187 to load 154.

Figure 8:
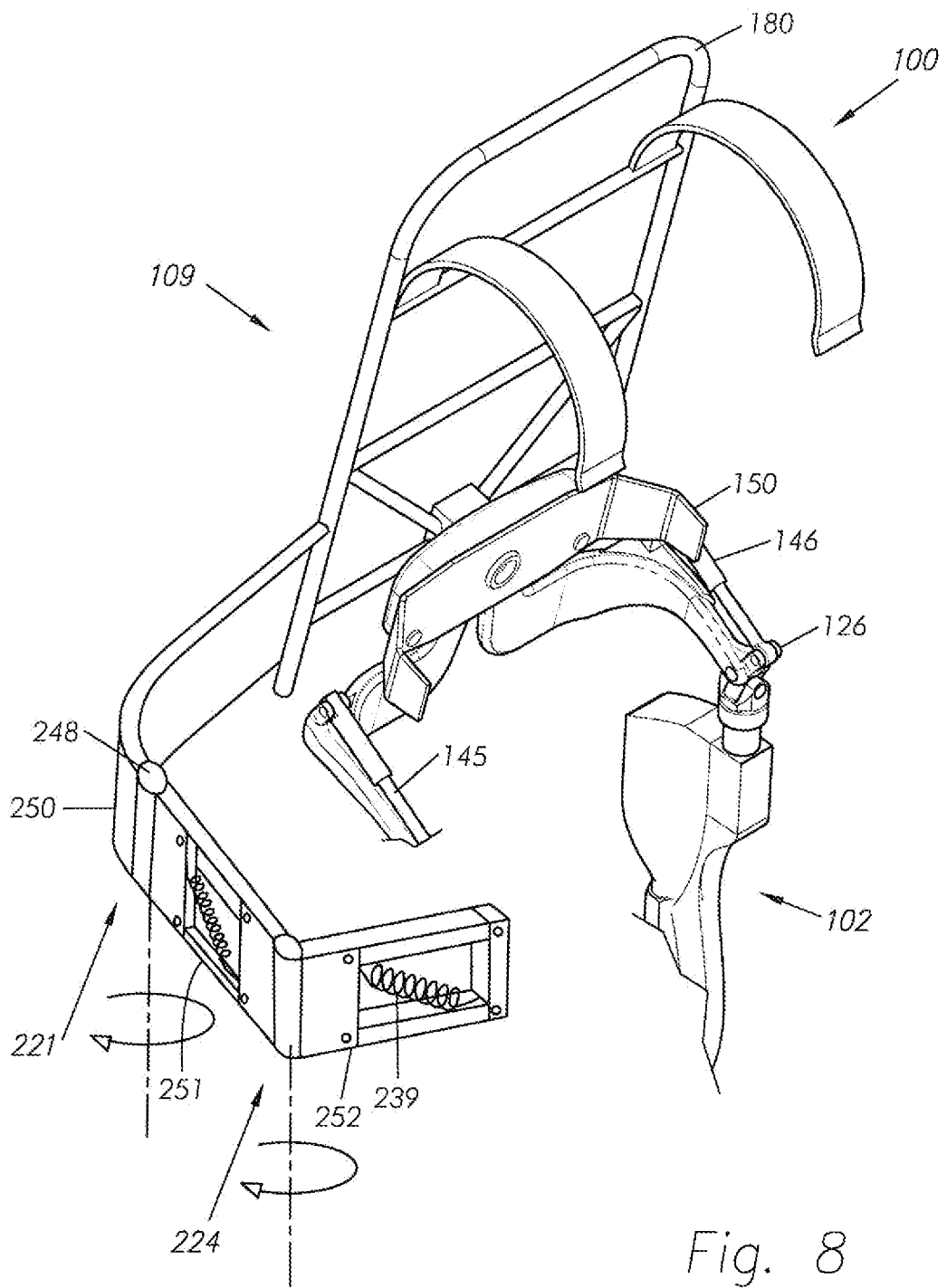
FIG. 8 is a front perspective drawing of an embodiment of the present invention including a side-mounted, multi-degree of freedom load holding mechanism.

In some embodiments of the invention, as shown in FIG. 8, load holding mechanism 221 includes a side-mounted multi-degree of freedom mechanism 224 that can be used to support front load 154 in front of person 187 and allows controlled movement of load 154 relative to exoskeleton 100. Multi-degree of freedom mechanism 224 includes a plurality of serially linked hinged links or segments 250-252. Each segment is connected to another segment via a hinge or joint 248. In this first embodiment shown, multi-degree of freedom mechanism 224 is coupled to exoskeleton trunk 109 on the back of person 187. In an alternative embodiment depicted in FIG. 9, a front-mounted multi-degree of freedom mechanism 224 is coupled to exoskeleton trunk 109 in the front of person 187. In the embodiment of FIG. 9, multi-degree of freedom mechanism 224 is shown coupled to a camera 299, a monitor 298 and a battery 297. However, it should be understood that multi-degree of freedom mechanism 224 may be coupled to any desired load 154, such as tools or weapons. In some embodiments, as shown in FIG. 10, multi-degree of freedom mechanism 224 is coupled to exoskeleton trunk 109 over the shoulder of person 187 through over-shoulder member 138.

In some embodiments, as shown in FIG. 8, joints 248 of multi-degree of freedom mechanism 224 are spring loaded via springs 239 in order to aid load holding mechanism 221 to hold load 154 up without a user providing force to do so. In some embodiments, joints 248 of multi-degree of freedom mechanism 224 are spring-loaded to produce a force which generally compensates for the weight of front load 154. This has the effect of allowing the operator to be able to move load 154 vertically with little effort, essentially keeping front load 154 floating in front of the operator. In FIG. 9, multi-degree of freedom mechanism 224 is shown wherein joints 248 of the mechanism include torsion springs incorporated therein (not shown) to produce a similar effect. In some embodiments, as shown in FIG. 10, multi-degree of freedom mechanism 224 further includes one or more serial links 229 to enhance the selective positioning of front load 154 relative to exoskeleton trunk 109. More specifically, the plurality of serially linked hinged segments 251, 252 are free to rotate with respect to each other about axes 240, which are generally parallel to the gravitational vector, allowing an operator of exoskeleton 100 to change the position of load 154 while moving it in a plane that is generally parallel to the ground. In some embodiments, as shown in FIG. 10, multi-degree of freedom mechanism 224 further includes a four bar linkage 238 (or other linkage with similar functionality) including panels hingedly attached at 257 to position front load 154 vertically (to move it in a direction generally parallel to the gravity vector).

Advantageously, the present invention provides a lower extremity exoskeleton which aides a user in carrying a variety of objects, such as various tools, weapons, camera equipment and other heavy objects, and reduces the energy necessary for tasks such as loading, lifting, carrying and unloading an object. Although described with reference to preferred embodiments of the invention, it should be readily understood that various changes and/or modifications can be made to the invention without departing from the spirit thereof. For instance, the exoskeleton may include multiple load holding mechanisms. For example, the multi-degree of freedom load holding mechanism discussed above may be attached to the frame at the side of a user, while another load bearing mechanism is attached over the shoulders of a user. In general, the invention is only intended to be limited by the scope of the following claims.

The invention claimed is:

1. A method for supporting an object using an exoskeleton configurable to be coupled to a person comprising:
    coupling an object to a load holding mechanism of an exoskeleton including: first and second leg supports configurable to be coupled to a person's lower limbs and rest on a support surface during a stance phase, wherein each leg support includes a thigh link and a shank link; first and second knee joints connecting the thigh links and shank links of the respective first and second leg supports to allow flexion and extension between respective shank and thigh links; an exoskeleton trunk configurable to be coupled to a person's upper body and rotatably connected to the thigh link of each of the first and second leg supports to allow for flexion and extension between the first and second leg supports and the exoskeleton trunk, with the load holding mechanism being coupled to said exoskeleton trunk and configurable to provide hands-free support of at least a portion of a weight of the object located in front of a person coupled to the exoskeleton, independent of upper limbs of a person coupled to the exoskeleton; and at least one hip torque generator configured to create torque between the exoskeleton trunk and one of the first and second thigh links in a stance phase; and
    creating a first torque with the at least one torque generator between said exoskeleton trunk and the one of the first and second thigh links in the stance phase opposing a second torque generated on the exoskeleton by the weight of the object.

2. The method of claim 1, further comprising:
    generating a load signal, wherein said load signal represents a portion of a force or a torque applied by said object onto said exoskeleton and said the torque applied by the at least one torque generator is a function of said load signal.

3. The method of claim 2, wherein said load signal is generated manually by a person.

4. The method of claim 2, wherein said load signal is generated by a load sensor.

5. The method of claim 4, wherein said load sensor is located between said exoskeleton trunk and said load holding mechanism.

6. The method of claim 4, wherein said load sensor is located in said first and second leg supports.

7. The method of claim 4, wherein said exoskeleton further comprises first and second exoskeleton feet connected to respective shank links, and said load sensor comprises a load sensor located in each of the first and second exoskeleton feet, and wherein generating the load signal comprises generating a load signal based on a load sensed by at least one of the load sensors located in each of the first and second exoskeleton feet.

8. The method of claim 4, wherein said load sensor is a force measuring device generating a load signal wherein said load signal represents a portion of a force or a torque applied by said object onto said exoskeleton.

9. The method of claim 1, wherein said object comprises an element or combination of elements selected from the group consisting of a box, a camera, a battery, a monitor and a projectile.

10. The method of claim 1, further comprising:
moving the object from a first location to a second location using the exoskeleton by walking with the exoskeleton from the first location to the second location; and
disengaging the object from the load holding mechanism at the second location.

11. The method of claim 1, wherein the at least one torque generator constitutes first and second hip torque actuators configured to create torque between the exoskeleton trunk and respective first and second leg supports, and wherein the step of creating the first torque with the at least one torque generator between the exoskeleton trunk and the one of the first and second thigh links in the stance phase comprises:
sensing a force between a user's first foot and a first exoskeleton foot;
sensing a force between a user's second foot and a second exoskeleton foot;
determining a user's intended load distribution for the first foot;
determining a user's intended load distribution for the second foot;
applying a torque to the first hip actuator, wherein the torque applied by the first hip actuator is calculated to oppose the torque created by a load on the first foot based on the intended load distribution for the first foot; and
applying a torque to the second hip actuator, wherein the torque applied by the second hip actuator is calculated to oppose the torque created by the load on the first foot based on the intended load distribution for the first foot.

12. The method of claim 11, further comprising:
estimating a forward velocity of the exoskeleton;
determining when a walking event has started;
calculating a total torque required by the first and second hip actuators to cancel the torque imposed on the exoskeleton by the load;
adding the total torque to the torque applied to one or both of the first and second hip actuators when the one or both of the first and second hip actuators are determined to be in a stance phase.

13. A method for controlling an exoskeleton configurable to be coupled to a person comprising:
sensing a torque applied to a load holding mechanism by a load sensor provided on an exoskeleton including first and second leg supports configurable to be coupled to a person's lower limbs and configured to rest on the ground during a stance phase, an exoskeleton trunk rotatably connectable to said first and second leg supports, at least one hip torque generator configured to create torque between said exoskeleton trunk and one of the first and second leg supports in the stance phase, a power unit in communication with the at least one hip torque generator for generating a torque to the at least one hip torque generator, with the load holding mechanism being coupled to said exoskeleton trunk and configurable to provide hands-free support of at least a portion of a weight of an object located in front of a person coupled to the exoskeleton, independent of upper limbs of a person coupled to the exoskeleton;
generating a signal representative of the torque applied to said load holding mechanism;
processing a signal from the load sensor using said power unit; and
applying a torque to the at least one hip torque generator to cancel at least a portion of the torque applied to the load holding mechanism.

14. An exoskeleton, configurable to be coupled to a person, said exoskeleton comprising:
first and second leg supports configurable to be coupled to a person's lower limbs and rest on a support surface during a stance phase, wherein each leg support includes a thigh link and a shank link;
first and second knee joints connecting the thigh links and shank links of the respective first and second leg supports to allow flexion and extension between respective shank and thigh links;
an exoskeleton trunk configurable to be coupled to a person's upper body and rotatably connected to the thigh link of each of the first and second leg supports to allow for flexion and extension between the first and second leg supports and the exoskeleton trunk;
at least one hip torque generator configured to create torque between said exoskeleton trunk and one of the first and second thigh links; and
a load holding mechanism coupled to said exoskeleton trunk for selective movement of the load holding mechanism relative to the exoskeleton trunk, the load holding mechanism configured to provide hands-free support of at least a portion of a weight of a load located in front of a person coupled to the exoskeleton, independent of upper limbs of a person coupled to the exoskeleton, wherein when said exoskeleton is worn by a person, the at least one torque generator creates a first torque between said exoskeleton trunk and the one of the first and second thigh links in the stance phase, opposing a second torque generated on the exoskeleton by the weight of the load.

15. The exoskeleton of claim 14, wherein the load holding mechanism is connected to the exoskeleton trunk through at least one over-shoulder member.

16. The exoskeleton of claim 14, wherein said at least one torque generator is a spring.

17. The exoskeleton of claim 14, wherein said at least one torque generator is an actuator.

18. The exoskeleton of claim 14, wherein at least one torque generator constitutes an actuator selected from the group consisting of hydraulic actuators, hydraulic rotary actuators, hydraulic cylinders, electric motors, pneumatic actuators and combinations thereof.

19. The exoskeleton of claim 15, wherein said load holding mechanism is coupled to said at least one over-shoulder member via a hinge.

20. The exoskeleton of claim 19, wherein said hinge is spring loaded.

21. The exoskeleton of claim 19, wherein the hinge is a flexible hinge member comprises an element selected from the group consisting of leather, fabric, elastomer, rubber, cloth, plastic and combinations thereof.

22. The exoskeleton of claim 19, wherein said hinge is located in front of a person coupled to the exoskeleton.

23. The exoskeleton of claim 15, wherein said over-shoulder member is coupled to said exoskeleton trunk via a hinge allowing for rotation of said load holding mechanism relative to said exoskeleton trunk.

24. The exoskeleton of claim 23, wherein said rotation is about a coronal plane of the person in a sagittal direction.

25. The exoskeleton of claim 23, wherein said hinge is located behind a person coupled to the exoskeleton.

26. The exoskeleton of claim 23, wherein said over-shoulder member is a U-shaped component capable of rotation relative to said exoskeleton trunk in about a coronal plane of the person in a sagittal direction via the hinge.

27. The exoskeleton of claim 14, wherein said load holding mechanism includes a load holding member located in front of a person coupled to the exoskeleton to support said load in front of a person coupled to the exoskeleton.

28. The exoskeleton of claim 27, wherein said load holding member is rotatably connected to a portion of the load holding mechanism such that the load holding member moves relative to the portion of the load holding mechanism.

29. The exoskeleton of claim 27, wherein said load holding member includes a plate situated generally horizontally.

30. The exoskeleton of claim 14, wherein said load holding mechanism further includes a multi-degree of freedom mechanism that allows for controlled movement of the load with respect to the exoskeleton.

31. The exoskeleton of claim 30, wherein said load holding mechanism is coupled to the over-shoulder member in front of a person coupled to the exoskeleton.

32. The exoskeleton of claim 30, wherein said multi-degree of freedom mechanism further includes a serial link mechanism comprising a series of links serially connected to each other.

33. The exoskeleton of claim 30, wherein said multi-degree of freedom mechanism further includes a parallel link mechanism comprising a series of links connected to each other in a parallel form.

34. The exoskeleton of claim 30, wherein at least one link of said multi-degree of freedom mechanism is spring loaded.

35. The exoskeleton of claim 30, wherein at least one link of said multi-degree of freedom mechanism is spring-loaded to generally keep said load afloat.

36. The exoskeleton of claim 15, wherein said load holding mechanism is coupled to said over-shoulder member via a suspension mechanism capable of attenuating oscillations from said exoskeleton trunk and a person coupled to the exoskeleton to said load.

37. The exoskeleton of claim 36, wherein said suspension mechanism includes a spring.

38. The exoskeleton of claim 36, wherein said suspension mechanism includes a damper.

39. The exoskeleton of claim 14, further comprising:
a power unit in communication with the at least one hip torque generator for selectively supplying torque to the at least one hip torque generator; and
at least one load sensor in communication with the power unit for sensing a torque applied to said load holding mechanism by said load, wherein said power unit is adapted to control the at least one hip torque generator based on a signal from said load sensor.

40. The exoskeleton of claim 39, further comprising:
first and second feet connected to respective first and second shank links, wherein the at least one load sensor comprises first and second load sensors connected to the respective first and second feet.

41. The exoskeleton of claim 14, further comprising:
a power unit in communication with the at least one hip torque generator for selectively supplying torque to the at least one hip torque generator;
a signal processor in communication with the power unit; and
a sensor adapted to estimate a forward velocity of the exoskeleton in communication with the signal processor.

* * * * *